(12) United States Patent
Iwata et al.

(10) Patent No.: US 11,516,294 B2
(45) Date of Patent: Nov. 29, 2022

(54) SWITCH DEVICE, MONITORING METHOD AND MONITORING PROGRAM

(71) Applicants: SUMITOMO ELECTRIC INDUSTRIES, LTD., Osaka (JP); AUTONETWORKS TECHNOLOGIES, LTD., Yokkaichi (JP); SUMITOMO WIRING SYSTEMS, LTD., Yokkaichi (JP)

(72) Inventors: Akihito Iwata, Osaka (JP); Takeshi Hagihara, Yokkaichi (JP); Yasuhiro Yabuuchi, Yokkaichi (JP)

(73) Assignees: SUMITOMO ELECTRIC INDUSTRIES, LTD., Osaka (JP); AUTONETWORKS TECHNOLOGIES, LTD., Mie (JP); SUMITOMO WIRING SYSTEMS, LTD., Mie (JP)

( * ) Notice: Subject to any disclaimer, the term of this patent is extended or adjusted under 35 U.S.C. 154(b) by 87 days.

(21) Appl. No.: 16/976,002

(22) PCT Filed: Nov. 30, 2018

(86) PCT No.: PCT/JP2018/044105
§ 371 (c)(1),
(2) Date: Aug. 26, 2020

(87) PCT Pub. No.: WO2019/167370
PCT Pub. Date: Sep. 6, 2019

(65) Prior Publication Data
US 2021/0105324 A1    Apr. 8, 2021

(30) Foreign Application Priority Data

Mar. 2, 2018   (JP) .............................. JP2018-037429

(51) Int. Cl.
*H04L 67/12* (2022.01)
*H04L 12/46* (2006.01)
*H04L 9/40* (2022.01)

(52) U.S. Cl.
CPC .............. *H04L 67/12* (2013.01); *H04L 12/46* (2013.01); *H04L 63/08* (2013.01)

(58) Field of Classification Search
CPC .......... H04L 67/12; H04L 12/46; H04L 63/08
See application file for complete search history.

(56) References Cited

U.S. PATENT DOCUMENTS 6,259,706 B1    7/2001   Shimada
2004/0148417 A1  7/2004   Roh et al.
(Continued)

FOREIGN PATENT DOCUMENTS

JP    H11-127215 A    5/1999
JP    2002-318735 A   10/2002
(Continued)

OTHER PUBLICATIONS

Aug. 3, 2021 Office Action issued in Chinese Patent Application No. 201880090199.8.
(Continued)

*Primary Examiner* — Samina F Choudhry
(74) *Attorney, Agent, or Firm* — Oliff PLC

(57) ABSTRACT

A switch device includes: a switch unit configured to relay an Ethernet frame between a plurality of function units installed in a vehicle; a monitoring unit configured to monitor predetermined data in the Ethernet frame; and a specification unit configured to specify a protocol being used by a target function unit which is a function unit serving as a transmission source of the Ethernet frame, based on a monitoring result of the monitoring unit. The monitoring unit performs an operation monitoring process of selectively
(Continued)

monitoring an operation of the target function unit according to the target protocol that is the protocol specified by the specification unit.

7 Claims, 5 Drawing Sheets

(56) References Cited

U.S. PATENT DOCUMENTS

| | | | |
|---|---|---|---|
| 2009/0271171 A1 | 10/2009 | Nakayama et al. | |
| 2016/0173530 A1 | 6/2016 | Miyake | |
| 2018/0324640 A1* | 11/2018 | Kaneko | H04W 88/16 |

FOREIGN PATENT DOCUMENTS

| | | |
|---|---|---|
| JP | 2007-310780 A | 11/2007 |
| JP | 2009-246453 A | 10/2009 |
| JP | 2012-080378 A | 4/2012 |
| JP | 2013-168865 A | 8/2013 |
| JP | 2017-005617 A | 1/2017 |

OTHER PUBLICATIONS

Kitani et al.; "Development of Data Communication Method In-Vehicle Network for Automated Driving"; IPSJ SIG Technical Report; Information Processing Society of Japan; 2016; vol. 2016-GN-97; No. 21; pp. 1-8.

Kitani, Mitsuhiro et al., "Development of Data Communication Method In-Vehicle Network for Automated Driving," IPSJ SIG Technical Reports, 2016, vol. 2016-GN-97, 2016-CDS-15, 2016-DCC-12, pp. 1-8, "3. Automated driving network design and agenda" (pp. 2-3).

Feb. 5, 2019 International Search Report issued in International Patent Application No. PCT/JP2018/044105.

* cited by examiner

FIG. 3

| Field Name | Version /IHL | TOS | Total Length | Identification | Frag Offset | TTL | IP Proto | Header CheckSum | Source IP Address | Destination IP Address | Source Port | Destination Port | ... |
|---|---|---|---|---|---|---|---|---|---|---|---|---|---|
| Data | 45 | xx | xx | xx | xx | xx | 6:TCP 17:UDP | xx | xx xx xx xx | xx xx xx xx | xx xx | 20: ftp 80: http | xx xx |
| Header Name | IP Header | | | | | | | | | | TCP/UDP Header | | |

FIG. 4

| Function Unit | L4 Protocol | L7 Protocol |
|---|---|---|
| 111A | TCP | ftp or http |
| 111B | UDP | Predetermined Protocol |
| 111C | TCP | ftp or http |

SWITCH DEVICE, MONITORING METHOD AND MONITORING PROGRAM

TECHNICAL FIELD

The present invention relates to a switch device, a monitoring method, and a monitoring program.

This application claims priority on Japanese Patent Application No. 2018-37429 filed on Mar. 2, 2018, the entire content of which is incorporated herein by reference.

BACKGROUND ART

PATENT LITERATURE 1 (Japanese Laid-Open Patent Publication No. 2013-168865) discloses an on-vehicle network system as follows. That is, the on-vehicle network system includes: an on-vehicle control device having a memory that stores therein definition data defining a part, of a communication protocol used in an on-vehicle network, which depends on implementation on the on-vehicle network; and a communication protocol issuing device that issues the definition data to the on-vehicle control device. When the communication protocol issuing device receives, from a registration device that allows the on-vehicle control device to participate in the on-vehicle network, a registration request that requests participation of the on-vehicle control device in the on-vehicle network, the communication protocol issuing device performs authentication for the registration device, creates the definition data based on implementation on the on-vehicle network, and returns the definition data to the registration device. The registration device receives the definition data transmitted from the communication protocol issuing device, and requests the on-vehicle control device to store the received definition data in the memory. Then, the on-vehicle control device receives the definition data from the registration device, stores the definition data in the memory, and performs communication by using the on-vehicle network, based on the part, of the communication protocol, defined by the definition data.

CITATION LIST

Patent Literature

PATENT LITERATURE 1: Japanese Laid-Open Patent Publication No. 2013-168865

SUMMARY OF INVENTION (1) A switch device according to the present disclosure includes: a switch unit configured to relay an Ethernet frame between a plurality of function units installed in a vehicle; a monitoring unit configured to monitor predetermined data in the Ethernet frame; and a specification unit configured to specify a protocol being used by a target function unit which is a function unit serving as a transmission source of the Ethernet frame, based on a monitoring result of the monitoring unit. The monitoring unit performs an operation monitoring process of selectively monitoring an operation of the target function unit according to the target protocol that is the protocol specified by the specification unit.

(8) A monitoring method according to the present disclosure is a monitoring method to be performed in a switch device that relays an Ethernet frame between a plurality of function units installed in a vehicle. The method includes: monitoring predetermined data in the Ethernet frame; specifying a protocol being used by a target function unit which is a function unit serving as a transmission source of the Ethernet frame, based on a monitoring result of the predetermined data; and performing an operation monitoring process of selectively monitoring an operation of the target function unit according to the target protocol that is the specified protocol.

(9) A monitoring program according to the present disclosure is a monitoring program to be used in a switch device that relays an Ethernet frame between a plurality of function units installed in a vehicle. The monitoring program causes a computer to function as: a monitoring unit configured to monitor predetermined data in the Ethernet frame; and a specification unit configured to specify a protocol being used by a target function unit which is a function unit serving as a transmission source of the Ethernet frame, based on a monitoring result of the monitoring unit. The monitoring unit performs an operation monitoring process of selectively monitoring an operation of the target function unit according to a target protocol that is the protocol specified by the specification unit.

One mode of the present disclosure is not only realized as a switch device including such a characteristic processing unit but also as a semiconductor integrated circuit that realizes a part or the entirety of the switch device, or as a system including the switch device.

BRIEF DESCRIPTION OF DRAWINGS

FIG. 3 shows a part of an Ethernet frame monitored by a switch device according to the embodiment of the present disclosure.

FIG. 4 shows an example of table information created by the switch device according to the embodiment of the present disclosure.

DESCRIPTION OF EMBODIMENTS

Figure 1:
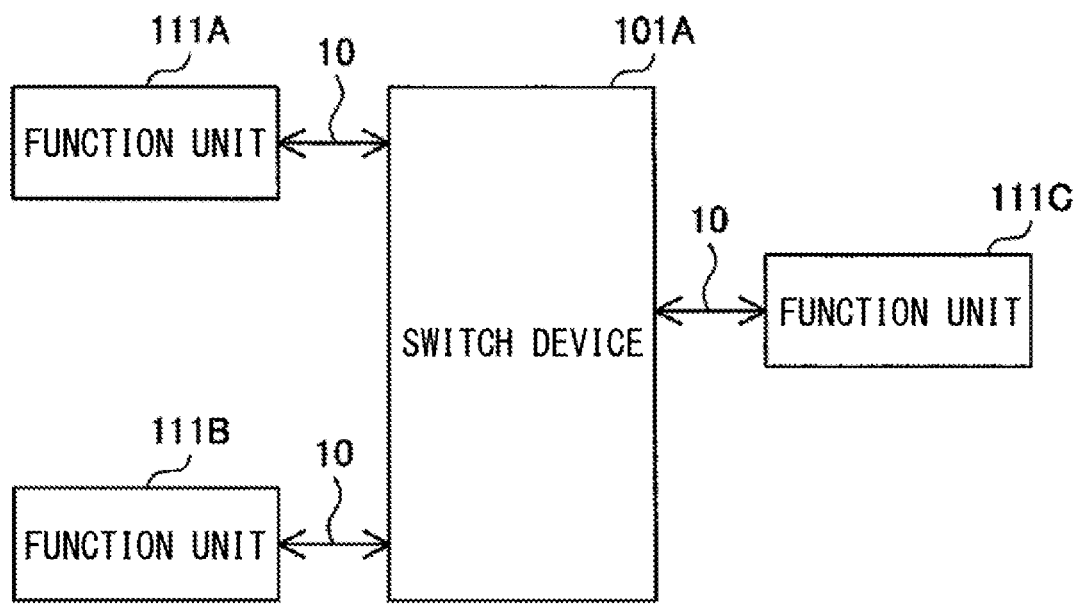
FIG. 1 shows a configuration of an on-vehicle communication system according to an embodiment of the present disclosure.

To date, on-vehicle network systems for improving security in on-vehicle networks have been developed.

Problems to be Solved by the Present Disclosure

The on-vehicle network disclosed in PATENT LITERATURE 1 is provided with a communication gateway for relaying communication data transmitted/received between on-vehicle ECUs (Electronic Control Units).

In order to detect abnormality in each on-vehicle ECU, a method of transmitting various types of frames from the communication gateway to the on-vehicle ECU and confirming the content of a response from the on-vehicle ECU, is conceivable.

In this method, however, the frames transmitted from the communication gateway are likely to cause an increase in traffic between the communication gateway and the on-vehicle ECU. In addition, it is likely to take time until the communication gateway completes confirmation of the content of the response from the on-vehicle ECU.

The present disclosure has been made in order to solve the above problem. An object of the present disclosure is to provide a switch device, a monitoring method, and a monitoring program that can efficiently detect abnormality in an on-vehicle network.

Effects of the Present Disclosure

According to the present disclosure, it is possible to efficiently detect abnormality in an on-vehicle network.

DESCRIPTION OF EMBODIMENT OF THE PRESENT DISCLOSURE

First, contents of embodiments of the present disclosure are listed and described.

(1) A switch device according to an embodiment of the present disclosure includes: a switch unit configured to relay an Ethernet frame between a plurality of function units installed in a vehicle; a monitoring unit configured to monitor predetermined data in the Ethernet frame; and a specification unit configured to specify a protocol being used by a target function unit which is a function unit serving as a transmission source of the Ethernet frame, based on a monitoring result of the monitoring unit. The monitoring unit performs an operation monitoring process of selectively monitoring an operation of the target function unit according to a target protocol that is the protocol specified by the specification unit.

With this configuration, since the switch device can recognize the protocol being used by each function unit, monitoring of unused protocols is not necessary. This allows the abnormality monitoring process to be performed in a shorter time. Therefore, abnormality in the on-vehicle network can be efficiency detected.

(2) Preferably, the monitoring unit, in the operation monitoring process, transmits a predetermined Ethernet frame according to the target protocol to the target function unit.

With this configuration, since predetermined Ethernet frames for monitoring unused protocols need not be transmitted, the kinds of Ethernet frames used for the operation confirmation process can be reduced, thereby inhibiting an increase in traffic and processing time.

(3) More preferably, the monitoring unit, in the operation monitoring process, monitors a response frame, which is a response to the transmitted predetermined Ethernet frame, from the target function unit.

With this configuration, the switch device can detect that communication with the target function unit according to the protocol being used is deteriorated or disabled, for example.

(4) Preferably, the switch device further includes a change unit configured to perform a change process of causing the target function unit to change the protocol being used, when abnormality in the target function unit is detected in the operation monitoring process.

With this configuration, for example, when communication using a specific protocol is deteriorated or disabled in a function unit, communication can be continued by using a different protocol.

(5) More preferably, the switch device further includes a creation unit for creating table information indicating the target protocol for each of the function units, and the change unit performs the change process by using the table information created by the creation unit.

With this configuration, since a protocol that was already used in a function unit can be specified, a protocol available in this function unit can be easily specified, whereby protocol change can be efficiently performed.

(6) More preferably, the switch device further includes a storage unit configured to store therein the table information created by the creation unit. The creation unit updates the table information stored in the storage unit, and the change unit performs the change process by using the table information stored in the storage unit.

With this configuration, for example, when a function unit uses a new protocol, the switch device can specify this protocol. Thus, accuracy in detecting abnormality in the function unit can be improved.

(7) Preferably, the vehicle is a vehicle performing automated driving.

With this configuration, since the monitoring process can be performed in a shorter time in the vehicle, the vehicle can continue automated driving with stability.

(8) A monitoring method according to an embodiment of the present disclosure is a monitoring method to be performed in a switch device that relays an Ethernet frame between a plurality of function units installed in a vehicle. The method includes: monitoring predetermined data in the Ethernet frame; specifying a protocol being used by a target function unit which is a function unit serving as a transmission source of the Ethernet frame, based on a monitoring result of the predetermined data; and performing an operation monitoring process of selectively monitoring an operation of the target function unit according to the target protocol that is the specified protocol.

With this configuration, since the switch device can recognize the protocol being used by each function unit, monitoring of unused protocols is not necessary. This allows the abnormality monitoring process to be performed in a shorter time. Therefore, abnormality in the on-vehicle network can be efficiency detected.

(9) A monitoring program according to an embodiment of the present disclosure is a monitoring program to be used in a switch device that relays an Ethernet frame between a plurality of function units installed in a vehicle. The monitoring program causes a computer to function as: a monitoring unit configured to monitor predetermined data in the Ethernet frame; and a specification unit configured to specify a protocol being used by a target function unit which is a function unit serving as a transmission source of the Ethernet frame, based on a monitoring result of the monitoring unit. The monitoring unit performs an operation monitoring process of selectively monitoring an operation of the target function unit according to a target protocol that is the protocol specified by the specification unit.

With this configuration, since the switch device can recognize the protocol being used by each function unit, monitoring for unused protocols is not necessary. This allows the abnormality monitoring process to be performed in a shorter time. Therefore, abnormality in the on-vehicle network can be efficiency detected.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

[Configuration and Basic Operation]

FIG. 1 shows a configuration of an on-vehicle communication system according to an embodiment of the present disclosure.

With reference to FIG. 1, an on-vehicle communication system 301 includes a switch device 101 and function units 111A, 111B, and 111C. The on-vehicle communication system 301 is installed in a vehicle 1.

Hereinafter, each of the function units 111A, 111B, and 111C is also referred to a function unit 111.

The configuration of the on-vehicle communication system 301 is not limited to a configuration including one switch device 101, but may be a configuration including a plurality of switch devices 101.

The configuration of the on-vehicle communication system 301 is not limited to a configuration including three function units 111, but may be a configuration including two, four, five or more function units 111.

Each function unit 111 is, for example, an automated driving ECU (Electronic Control Unit), a driving support device, a sensor, or the like, and can communicate with the switch device 101. This allows the vehicle 1 to perform automated driving, for example.

The connection relationship between the switch device 101 and each function unit 111 in an on-vehicle network of the vehicle 1 is fixed, for example.

The switch device 101 and each function unit 111 are connected to each other by, for example, an on-vehicle Ethernet (registered trademark) communication cable (hereinafter, also referred to as "Ethernet cable") 10.

The switch device 101 and the function unit 111 communicate with each other by using the Ethernet cable 10. Between the switch device 101 and the function unit 111, communication data is exchanged by using an Ethernet frame according to IEEE802.3, for example.

[Problems]

As a method of monitoring abnormality in a function unit that exchanges communication data with a switch device by using an Ethernet frame, there is a method of periodically transmitting a predetermined management frame from the switch device to the function unit, and confirming a response from the function unit.

In this method, however, since various types of management frames corresponding to pieces of software or protocols, such as ftp (File Transfer Protocol), http (Hypertext Transfer Protocol), TCP (Transmission Control Protocol), and ICMP (Internet Control Message Protocol), are transmitted, congestion of communication data is likely to occur. In addition, it takes time until the contents of responses to all the management frames are confirmed.

When a plurality of function units are connected to the switch device, the same process as described above needs to be performed for each of the function units, which requires a long time.

The switch device according to the embodiment of the present disclosure solves the above problems by the following configurations and operations.

[Configuration of Switch Device]

Figure 2:
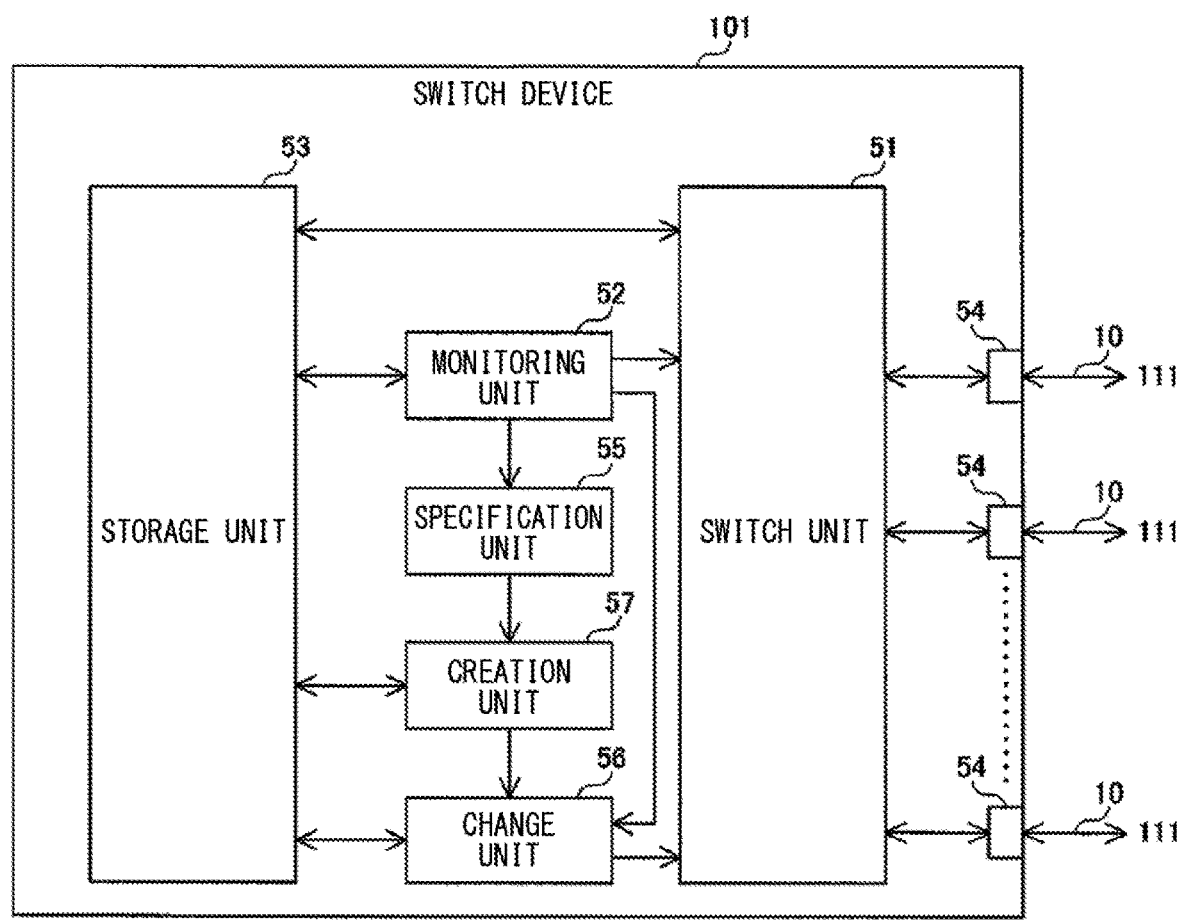
FIG. 2 shows a configuration of a switch device according to the embodiment of the present disclosure.

FIG. 2 shows the configuration of the switch device according to the embodiment of the present disclosure.

With reference to FIG. 2, the switch device 101 includes a switch unit 51, a monitoring unit 52, a storage unit 53, a plurality of communication ports 54, a specification unit 55, a change unit 56, and a creation unit 57.

The switch unit 51 relays Ethernet frames between a plurality of function units installed in a vehicle.

In more detail, the switch device 101 can relay the Ethernet frames between the plurality of function units according to, for example, a layer 2, and a layer 3, which is of a higher order than the layer 2.

Specifically, the switch unit 51 holds an address table indicating a correspondence relationship between the port number of each communication port 54, a VLAN ID, and a MAC address of a connection destination device.

For example, the switch unit 51 receives an Ethernet frame from the function unit 111, stores the received Ethernet frame in the storage unit 53, and confirms the destination MAC address of the Ethernet frame.

The switch unit 51 specifies a communication port 54 corresponding to the confirmed destination MAC address, with reference to the address table.

Then, the switch unit 51 acquires the Ethernet frame from the storage unit 53, and transmits the acquired Ethernet frame to the destination function unit 111 through the specified communication port 54.

The monitoring unit 52 monitors predetermined data in the Ethernet frame.

FIG. 3 shows a part of the Ethernet frame monitored by the switch device according to the embodiment of the present disclosure.

FIG. 3 shows an IP (Internet Protocol) header and a TCP/UDP (User Datagram Protocol) header in the Ethernet frame.

With reference to FIG. 3, the first 1 byte of the IP header is "Version/IHL (Internet Header Length)". The "Version" is IP version information, and the "IHL" is information indicating the length of the IP header.

The next 1 byte of the IP header is "TOS (Type of Service)", which is information indicating the priority level of the data.

The next 2 bytes of the IP header are "Total Length", which is information indicating the length of the data The next 2 bytes of the IP header are "Identification", which is an identifier.

The next 2 bytes of the IP header are "Flag/Flag Offset".

The next 1 byte of the IP header is "TTL (Time To Live)", which is information indicating a time during which the data can exist in the network.

The next 1 byte of the IP header is "Protocol", which is information indicating a protocol being used.

The next 2 bytes of the IP header are "Header Check-Sum", which is used for detecting an error in the IP header.

The next 4 bytes of the IP header are "Source Address", which is information indicating an IP address of a transmission source of the data.

The next 4 bytes of the IP header are "Destination Address", which is information indicating an IP address of a transmission destination of the data.

The IP header is followed by data of the TCP/UDP header. The first 2 bytes of the TCP/UDP header are "Source Port". The "Source Port" is information indicating a port number that is used in a transmission source of the data.

The next 2 bytes of the TCP/UDP header are "Destination Port", which is information indicating a port number that is used in a transmission destination of the data.

The monitoring unit 52 monitors the "Protocol" of the IP header and the "Destination Port" of the TCP/UDP header.

Specifically, the monitoring unit 52 confirms the Ethernet frame stored in the storage unit 53, and acquires the transmission source MAC address, the value of "Protocol" of the IP header, and the value of "Destination Port" of the TCP/UDP header, which are included in the Ethernet frame.

Hereinafter, the value of "Protocol" of the IP header is also referred to as "protocol value", and the value of "Destination Port" of the TCP/UDP header is also referred to as "application information".

The monitoring unit 52 outputs the acquired transmission source MAC address, protocol value, and application information as monitoring results to the specification unit 55.

The monitoring unit 52 may be configured to acquire at least one of the protocol value and the application information.

Based on the monitoring result received from the monitoring unit 52, the specification unit 55 specifies a protocol being used by a target function unit which is a function unit serving as a transmission source of the Ethernet frame.

In more detail, based on the transmission source MAC address and the protocol value received from the monitoring unit 52, the specification unit 55 specifies an L4 (layer 4) protocol being used by the target function unit.

Specifically, for example, when the monitoring result received from the monitoring unit 52 indicates that the transmission source MAC address is the MAC address of the function unit 111A and the protocol value is 6, i.e., 0x06 in hexadecimal, the specification unit 55 specifies that the L4 protocol used by the function unit 111A is TCP. A digit starting with "0x" means that the digits after "0x" are expressed by hexadecimal numbers.

For example, when the monitoring result received from the monitoring unit 52 indicates that the transmission source MAC address is the MAC address of the function unit 111A and the protocol value is 17, i.e., 0x11 in hexadecimal, the specification unit 55 specifies that the L4 protocol used by the function unit 111A is UDP.

The specification unit 55 specifies an L7 (layer 7) protocol being used by the target function unit, based on the transmission source MAC address and the application information received from the monitoring unit 52.

Specifically, for example, when the monitoring result received from the monitoring unit 52 indicates that the transmission source MAC address is the MAC address of the function unit 111A and the application information is 20, i.e., 0x14 in hexadecimal, the specification unit 55 specifies that the L7 protocol used by the function unit 111A is http.

For example, when the monitoring result received from the monitoring unit 52 indicates that the transmission source MAC address is the MAC address of the function unit 111A and the application information is 80, i.e., 0x50 in hexadecimal, the specification unit 55 specifies that the L7 protocol used by the function unit 111A is http.

The specification unit 55 outputs, to the creation unit 57, protocol information indicating combinations of the target function unit with the L4 protocol and the L7 protocol which are specified.

Based on the protocol information received from the specification unit 55, the creation unit 57 creates table information indicating target protocols for each function unit 111.

FIG. 4 shows an example of the table information created by the switch device according to the embodiment of the present disclosure.

With reference to FIG. 4, as for the target protocols used by the function unit 111A, the L4 protocol is TCP and the L7 protocol is ftp or http.

As for the target protocols used by the function unit 111B, the L4 protocol is UDP and the L7 protocol is a predetermined protocol.

As for the target protocols used by the function unit 111C, the L4 protocol is TCP and the L7 protocol is ftp or http.

When the creation unit 57 has received, from the specification unit 55, protocol information the content of which is different from the combination in the already-created table information, the creation unit 57 updates the table information based on the new protocol information.

The creation unit 57 stores the created or updated table information in the storage unit 53.

The monitoring unit 52 acquires the table information stored in the storage unit 53, and performs, by using the acquired table information, an operation monitoring process of selectively monitoring the operation of the target function unit according to the target protocol that is the protocol specified by the specification unit 55, i.e., the protocol indicated by the table information.

For example, in the operation monitoring process, the monitoring unit 52 transmits a predetermined Ethernet frame according to the target protocol, to the target function unit.

In more detail, the monitoring unit 52 transmits, for example, a management frame to the target function unit, and confirms a response from the target function unit. Specifically, the monitoring unit 52 monitors a response frame from the target function unit.

Specifically, when the function unit 111A uses TCP, the monitoring unit 52 performs the operation monitoring process by 3-way handshaking.

The monitoring unit 52 generates an Ethernet frame including an SYN packet, and transmits the generated Ethernet frame to the function unit 111A via the switch unit 51.

Upon receiving the Ethernet frame including the SYN packet and transmitted from the switch device 101, the function unit 111A generates an Ethernet frame including an SYN ACK packet as a response frame, and transmits the Ethernet frame to the switch device 101.

The switch unit 51 in the switch device 101 receives the Ethernet frame including the SYN ACK packet and transmitted from the function unit 111A, and stores the received Ethernet frame in the storage unit 53.

The monitoring unit 52 acquires the SYN ACK packet included in the Ethernet frame stored in the storage unit 53, generates an Ethernet frame including an ACK packet, and transmits the generated Ethernet frame to the function unit 111A via the switch unit 51.

When the monitoring unit 52 has failed the 3-way handshaking, such as when the monitoring unit 52 cannot acquire the SYN ACK packet, the monitoring unit 52 notifies the function unit 111B and the function unit 111C, which are the function units 111 other than the target function unit, of abnormality.

In more detail, the monitoring unit 52 generates an Ethernet frame including an abnormality notification that indicates abnormality in the target function unit, and transmits the generated Ethernet frame to the function unit 111B and the function unit 111C via the switch unit 51. The monitoring unit 52 also outputs the abnormality notification to the change unit 56.

For example, when the function unit 111A uses UDP, the monitoring unit 52 performs connection confirmation using Ping.

In more detail, the monitoring unit 52 generates an Ethernet frame including an ICMP echo request, and transmits the generated Ethernet frame to the function unit 111A via the switch unit 51.

The function unit 111A receives the echo request included in the Ethernet frame transmitted from the switch device 101, generates an Ethernet frame including an echo reply as a response frame, and transmits the Ethernet frame to the switch device 101.

The switch device 101 receives the Ethernet frame including the echo reply and transmitted from the function unit 111A, and stores the received Ethernet frame in the storage unit 53.

The monitoring unit 52 acquires the echo reply included in the Ethernet frame stored in the storage unit 53.

When the monitoring unit 52 cannot acquire the echo reply, the monitoring unit 52 notifies the function unit 111B and the function unit 111C, which are the function units 111 other than the target function unit, of abnormality.

In more detail, the monitoring unit 52 generates an Ethernet frame including an abnormality notification that indicates abnormality in the target function unit, and transmits the generated Ethernet frame to the function unit 111B and the function unit 111C via the switch unit 51. The monitoring unit 52 also outputs the abnormality notification to the change unit 56.

For example, when the function unit 111A uses ftp, the monitoring unit 52 performs confirmation of session connection by 3-way handshaking, for example, as in the case of TCP.

For example, when the function unit 111A uses http, the monitoring unit 52 performs status confirmation.

In more detail, the monitoring unit 52 generates an Ethernet frame including a status request that requests an HTTP status code indicating the status of the function unit 111A, and transmits the generated Ethernet frame to the function unit 111A via the switch unit 51.

The function unit 111A receives the status request included in the Ethernet frame transmitted from the switch device 101, generates an Ethernet frame including the HTTP status code as a response frame, and transmits the Ethernet frame to the switch device 101.

The switch device 101 receives the Ethernet frame including the HTTP status code and transmitted from the function unit 111A, and stores the received Ethernet frame in the storage unit 53.

The monitoring unit 52 acquires the HTTP status code included in the Ethernet frame stored in the storage unit 53.

When the monitoring unit 52 cannot acquire the HTTP status code, the monitoring unit 52 notifies the function unit 111B and the function unit 111C, which are the function units 111 other than the target function unit, of abnormality.

In more detail, the monitoring unit 52 generates an Ethernet frame including an abnormality notification that indicates abnormality in the target function unit, and transmits the generated Ethernet frame to the function unit 111B and the function unit 111C via the switch unit 51. The monitoring unit 52 also outputs the abnormality notification to the change unit 56.

For example, when abnormality in the target function unit has been detected in the operation monitoring process, the change unit 56 performs a change process of causing the target function unit to change the protocol being used.

In more detail, upon receiving the abnormality notification from the monitoring unit 52, the change unit 56 causes the protocol being used by each function unit 111 to be changed.

For example, the change unit 56 performs the change process by using the created table information.

In more detail, upon receiving the abnormality notification from the monitoring unit 52, the change unit 56 confirms the target protocol of the target function unit with reference to the table information stored in the storage unit 53.

Then, the change unit 56 selects another L4 protocol or L7 protocol to be newly used by the target function unit (hereinafter, this protocol is also referred to as "alternative protocol"), and transmits, to the target function unit, a change notification T1 that requests use of the alternative protocol.

In more detail, the change unit 56 generates an Ethernet frame including the change notification T1, and transmits the generated Ethernet frame to the target function unit via the switch unit 51.

Specifically, when the communication with the function unit 111C according to ftp is abnormal, the change unit 56 confirms, with reference to the table information stored in the storage unit 53, that a protocol, which is not ftp and is available in the function unit 111C, is http.

Then, the change unit 56 generates an Ethernet frame including a change notification T1 that requests use of http as an alternative protocol, and transmits the generated Ethernet frame to the function unit 111C via the switch unit 51.

Then, the change unit 56 causes a function unit 111, which is a communication partner of the abnormal target function unit, to change the protocol being used.

In more detail, the change unit 56 confirms an Ethernet frame which is stored in the storage unit 53 and whose transmission source MAC address is the MAC address of the target function unit, and acquires the destination MAC address included in this Ethernet frame.

Then, the change unit 56 generates an Ethernet frame including a change notification T2 that requests the function unit 111 corresponding to the destination MAC address (hereinafter, this function unit 111 is also referred to as "partner function unit") to use the alternative protocol, and transmits the generated Ethernet frame to the partner function unit via the switch unit 51.

[Operation Flow]

Each device in the on-vehicle communication system 301 includes a computer. An arithmetic processing unit such as a CPU in the computer reads out, from a memory (not shown), a program including a part or all of steps in the flowchart described below and executes the program. Programs of the plurality of devices can each be installed from outside. The programs of the plurality of devices are each distributed in a state of being stored in a storage medium.

Figure 5:
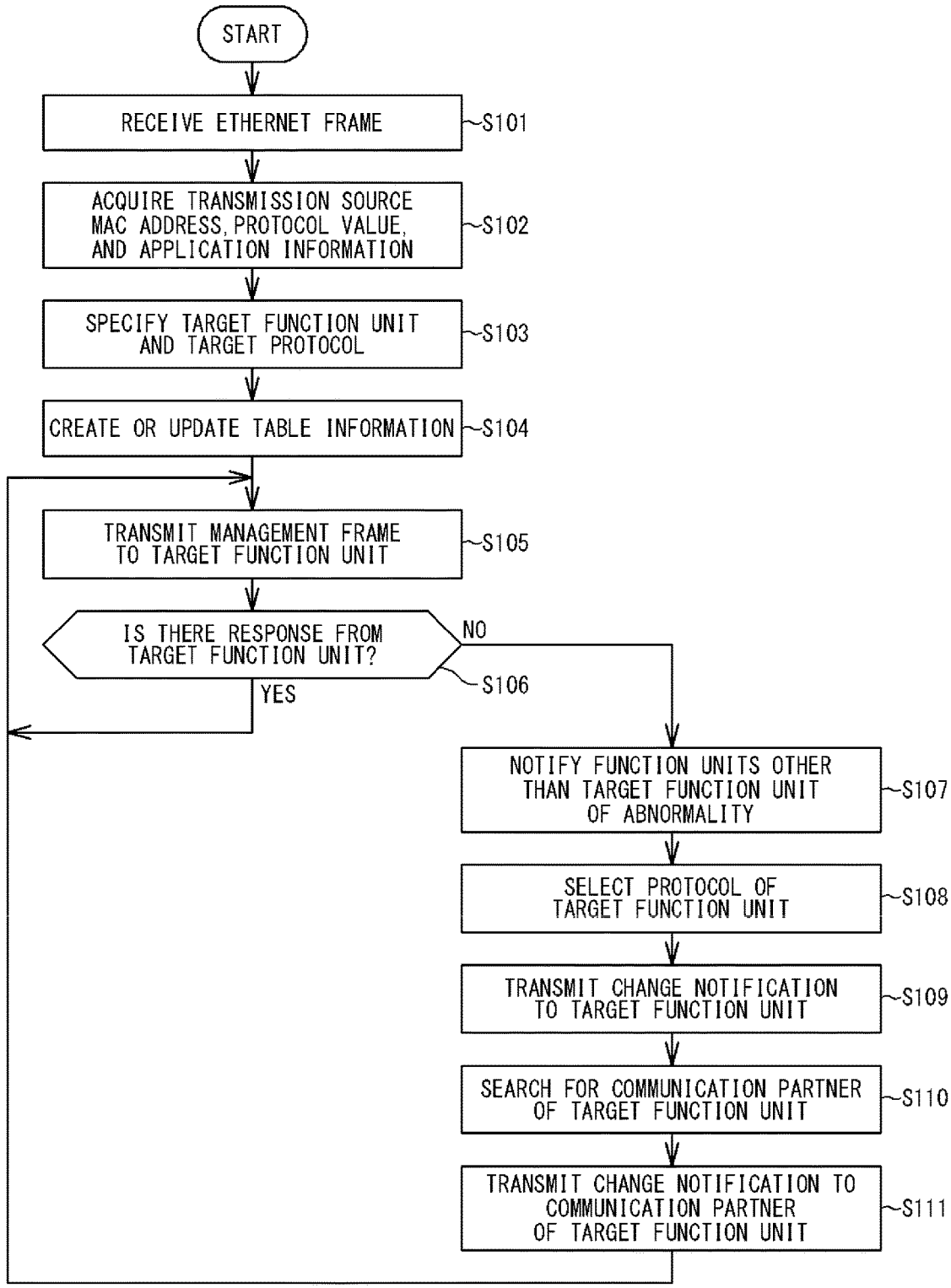
FIG. 5 is a flowchart describing an operation procedure performed when the switch device according to the embodiment of the present disclosure monitors communication between a plurality of function units.

FIG. 5 is a flowchart describing an operation procedure when the switch device according to the embodiment of the present disclosure monitors communication between a plurality of function units.

With reference to FIG. 5, first, the switch device 101 receives an Ethernet frame transmitted from a function unit 111 (step S101).

Next, the switch device 101 acquires a transmission source MAC address, a protocol value, and application information which are included in the received Ethernet frame (step S102).

Based on the acquired transmission source MAC address, protocol value, and application information, the switch device 101 specifies a target function unit and a target protocol (step S103).

Next, the switch device 101 creates or updates table information indicating the specified target function unit and target protocol (step S104).

According to the created or updated table information, the switch device 101 transmits a management frame based on the target protocol to the target function unit (step S105), and waits for a response from the target function unit (step S106).

When the switch device 101 has confirmed a response from the target function unit (YES in step S106), the switch device 101 periodically transmits the management frame based on the target protocol to the target function unit (step S105), and waits for a response from the target function unit (step S106).

On the other hand, when the switch device 101 cannot confirm a response from the target function unit (NO in step S106), the switch device 101 notifies the function units 111 other than the target function unit of abnormality (step S107).

Next, using the table information, the switch device 101 selects a new protocol to be used by the target function unit (step S108).

Next, the switch device 101 transmits, to the target function unit, a change notification T1 that requests use of the selected new protocol (step S109).

Next, the switch device 101 searches for a function unit 111 that is a communication partner of the target function unit (step S110).

Next, the switch device 101 transmits, to the function unit 111 that is the communication partner of the target function unit, a change notification T2 that requests use of the new protocol to be used by the target function unit (step S111).

Next, the switch device 101 transmits, to the target function unit, a management frame according to the protocol having been changed (step S105), and waits for a response from the target function unit (step S106).

In the switch device according to the embodiment of the present disclosure, the monitoring unit 52 is configured to transmit a predetermined Ethernet frame according to the target protocol to the target function unit in the operation monitoring process. However, the present disclosure is not limited thereto. The monitoring unit 52 may be configured to transmit a specific frame unrelated to the type of the protocol to the target function unit in the operation monitoring process.

In the switch device according to the embodiment of the present disclosure, the change unit 56 is configured to perform the change process when abnormality in the target function unit has been detected. However, the present disclosure is not limited thereto. The change unit 56 may be configured not to perform the change process even when abnormality in the target function unit has been detected.

In the switch device according to the embodiment of the present disclosure, the creation unit 57 is configured to create table information indicating a target protocol for each target function unit. However, the present disclosure is not limited thereto. The creation unit 57 may be configured not to create such table information. In this case, for example, when abnormality in the target function unit has been detected in the operation monitoring process, the change unit 56 changes the protocol being used by the target function unit to a predetermined protocol.

In the switch device according to the embodiment of the present disclosure, the change unit 56 is configured to select an alternative protocol, and transmit, to the target function unit, a change notification that requests the target function unit to use the alternative protocol. However, the present disclosure is not limited thereto. The change unit 56 may be configured to transmit a change notification that merely requests change of the protocol being used. In this case, upon receiving the change notification from the change unit 56, the target function unit changes the protocol being used, to another protocol, for example.

With the switch device according to the embodiment of the present disclosure, the vehicle 1 is configured to perform automated driving. However, the present disclosure is not limited thereto. The vehicle 1 may be configured not to perform automated driving.

In the switch device according to the embodiment of the present disclosure, the monitoring unit 52 is configured to, in the operation monitoring process, check a response from the target function unit, and detect abnormality in the target function unit when no response is confirmed. However, the present disclosure is not limited thereto. For example, the monitoring unit 52 may check an HTTP status code that is included in a response frame from the function unit 111 and indicates the state of the target function unit. When the HTTP status code is a code not assigned to the on-vehicle communication system 301, the monitoring unit 52 may detect abnormality in the target function unit.

The switch device 101 according to the embodiment of the present disclosure is provided with the storage unit 53. However, the present disclosure is not limited thereto. The storage unit 53 may be provided outside the switch device 101, for example.

Meanwhile, in order to detect abnormality in an on-vehicle ECU, a method of transmitting various types of frames from a communication gateway to the on-vehicle ECU and confirming the content of a response from the on-vehicle ECU, is conceivable.

In this method, however, the frames transmitted from the communication gateway are likely to cause an increase in traffic between the communication gateway and the on-vehicle ECU. In addition, it is likely to take time until the communication gateway completes confirmation of the content of the response from the on-vehicle ECU.

In the switch device according to the embodiment of the present disclosure, the switch unit 51 relays an Ethernet frame between the plurality of function units 111 installed in the vehicle 1. The monitoring unit 52 monitors predetermined data in the Ethernet frame. Based on the monitoring result of the monitoring unit 52, the specification unit 55 specifies a protocol being used by the target function unit which is a function unit 111 as a transmission source of the Ethernet frame. The monitoring unit 52 performs the operation monitoring process of selectively monitoring the operation of the target function unit according to the target protocol that is the protocol specified by the specification unit 55.

With this configuration, since the switch device 101 can recognize the protocol being used by each function unit 111, monitoring of unused protocols is not necessary. This allows the abnormality monitoring process to be performed in a shorter time.

Therefore, in the switch device according to the embodiment of the present disclosure, abnormality in the on-vehicle network can be efficiently detected.

In the switch device according to the embodiment of the present disclosure, the monitoring unit 52 transmits a predetermined Ethernet frame according to the target protocol to the target function unit in the operation monitoring process.

This configuration makes it unnecessary to transmit predetermined Ethernet frames for monitoring unused protocols. Thus, the kinds of Ethernet frames used for the operation confirmation process can be reduced, thereby inhibiting an increase in traffic and processing time.

In the switch device according to the embodiment of the present disclosure, the monitoring unit 52, in the operation monitoring process, monitors a response frame, which is a response to the transmitted predetermined Ethernet frame, from the target function unit.

This configuration allows the switch device 101 to detect that communication with the target function unit according to the protocol being used is deteriorated or disabled, for example.

In the switch device according to the embodiment of the present disclosure, the change unit 56 performs the change process of causing the target function unit to change the protocol being used, when abnormality in the target function unit has been detected in the operation monitoring process.

With this configuration, for example, when communication using a specific protocol is deteriorated or disabled in a function unit 111, communication can be continued by using a different protocol.

In the switch device according to the embodiment of the present disclosure, the creation unit 57 creates table information indicating a target protocol of each function unit 111. The change unit 56 performs the change process by using the table information created by the creation unit 57.

With this configuration, since a protocol that was already used in a function unit 111 can be specified, a protocol available in this function unit 111 can be easily specified, whereby protocol change can be efficiently performed.

In the switch device according to the embodiment of the present disclosure, the storage unit 53 stores therein the table information created by the creation unit 57. The creation unit 57 updates the table information stored in the storage unit 53. The change unit 56 performs the change process by using the table information stored in the storage unit 53.

With this configuration, for example, when a function unit 111 uses a new protocol, the switch device 101 can specify this protocol. Thus, accuracy in detecting abnormality in the function unit 111 is improved.

With the switch device according to the embodiment of the present disclosure, the vehicle 1 performs automated driving.

With this configuration, since the monitoring process can be performed in a shorter time in the vehicle 1, the vehicle 1 can continue automated driving with stability.

In the monitoring method performed by the switch device according to the embodiment of the present disclosure, first, predetermined data in an Ethernet frame is monitored. Next, based on the monitoring result of the predetermined data, a protocol being used by a target function unit that is a function unit 111 as a transmission source of the Ethernet frame, is specified. Next, an operation monitoring process of selectively monitoring the operation of the target function unit according to the target protocol that is the specified protocol, is performed.

With this configuration, since the switch device 101 can recognize the protocol being used by each function unit 111, monitoring of unused protocols is not necessary. Thus, the abnormality monitoring process can be performed in a shorter time.

Therefore, in the monitoring method performed by the switch device according to the embodiment of the present disclosure, abnormality in the on-vehicle network can be efficiently detected.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional note below.

[Additional Note 1]

A switch device comprising:

a switch unit configured to relay an Ethernet frame between a plurality of function units installed in a vehicle;

a monitoring unit configured to monitor predetermined data in the Ethernet frame; and a specification unit configured to specify a protocol being used by a target function unit which is a function unit serving as a transmission source of the Ethernet frame, based on a monitoring result of the monitoring unit, wherein the monitoring unit performs an operation monitoring process of selectively monitoring an operation of the target function unit according to a target protocol that is the protocol specified by the specification unit, the predetermined data in the Ethernet frame is at least one of a value of a protocol field in an IP header and a value of a destination port field in a TCP/UDP header, and the protocol is any of TCP, UDP, ftp, and http.

REFERENCE SIGNS LIST 1 vehicle
10 Ethernet cable
51 switch unit
52 monitoring unit
53 storage unit
54 communication port
55 specification unit
56 change unit
57 creation unit
101 switch device
111 function unit
301 on-vehicle communication system

The invention claimed is:

1. A switch device comprising:
a switch unit configured to relay an Ethernet frame between a plurality of function units installed in a vehicle;
a monitoring unit configured to monitor predetermined data in the Ethernet frame; and
a specification unit configured to specify a protocol being used by a target function unit which is a function unit serving as a transmission source of the Ethernet frame, based on a monitoring result of the monitoring unit, wherein
the monitoring unit performs an operation monitoring process of selectively monitoring an operation of the target function unit according to a target protocol that is the protocol specified by the specification unit,
the switch device further comprising:
a creation unit for creating table information indicating the target protocol for each of the function units; and
a change unit configured to perform a change process of causing the target function unit to change the protocol being used, when an abnormality in the target function unit is detected in the operation monitoring process,
wherein the change unit performs the change process by using the table information created by the creation unit.

2. The switch device according to claim 1, wherein the monitoring unit, in the operation monitoring process, transmits a predetermined Ethernet frame according to the target protocol to the target function unit.

3. The switch device according to claim 2, wherein the monitoring unit, in the operation monitoring process, monitors a response frame, which is a response to the transmitted predetermined Ethernet frame, from the target function unit.

4. The switch device according to claim 1 further comprising a storage unit configured to store therein the table information created by the creation unit, wherein
the creation unit updates the table information stored in the storage unit, and
the change unit performs the change process by using the table information stored in the storage unit.

5. The switch device according to claim 1, wherein the vehicle is a vehicle performing automated driving.

6. A monitoring method to be performed in a switch device that relays an Ethernet frame between a plurality of function units installed in a vehicle, the method comprising:
monitoring predetermined data in the Ethernet frame,
specifying a protocol being used by a target function unit which is a function unit serving as a transmission source of the Ethernet frame, based on a monitoring result of the predetermined data,
creating table information indicating a target protocol for each of the function units,
performing an operation monitoring process of selectively monitoring an operation of the target function unit according to the target protocol that is the specified protocol, and
performing a change process of causing the target function unit to change the protocol being used, when an abnormality in the target function unit is detected in the operation monitoring process,
wherein the change process is performed by using the table information.

7. A non-transitory computer readable storage medium storing a monitoring program to be used in a switch device that relays an Ethernet frame between a plurality of function units installed in a vehicle, the monitoring program causing a computer to function as:

a monitoring unit configured to monitor predetermined data in the Ethernet frame; and
a specification unit configured to specify a protocol being used by a target function unit which is a function unit serving as a transmission source of the Ethernet frame, based on a monitoring result of the monitoring unit, wherein
the monitoring unit performs an operation monitoring process of selectively monitoring an operation of the target function unit according to a target protocol that is the protocol specified by the specification unit, and
the monitoring program causing the computer to function as:
a creation unit for creating table information indicating the target protocol for each of the function units; and
a change unit configured to perform a change process of causing the target function unit to change the protocol being used, when an abnormality in the target function unit is detected in the operation monitoring process,
wherein the change unit performs the change process by using the table information created by the creation unit.

* * * * *